United States Patent [19]

Robertson

[11] 4,167,258

[45] Sep. 11, 1979

[54] AFT CARGO DOOR FOR AIRCRAFT

[75] Inventor: Arthur J. Robertson, Marietta, Ga.

[73] Assignee: Lockheed Corporation, Burbank, Calif.

[21] Appl. No.: 889,971

[22] Filed: Mar. 24, 1978

[51] Int. Cl.² ................................................ B64C 1/14
[52] U.S. Cl. ................................... 244/129.5; 49/143; 49/360
[58] Field of Search ............ 244/129.5, 137 R, 118 R; 49/40, 143, 360, 362; 296/146, 147

[56] References Cited

U.S. PATENT DOCUMENTS

| | | | |
|---|---|---|---|
| 2,104,144 | 1/1938 | Zand | 244/129.5 |
| 2,752,114 | 6/1956 | Calvy | 244/129.5 X |
| 3,147,942 | 9/1964 | Griffith | 244/129.5 X |
| 3,424,411 | 1/1969 | Blunschi et al. | 244/118 R X |
| 3,544,046 | 12/1970 | Belolipetsky et al. | 244/129.5 X |
| 3,585,757 | 6/1971 | Ritchie et al. | 49/40 X |
| 4,088,288 | 5/1978 | Barnes | 244/129.5 |

Primary Examiner—Barry L. Kelmachter
Attorney, Agent, or Firm—John J. Sullivan

[57] ABSTRACT

A rotary segment aft cargo door for aircraft is geometrically defined by an arcuate slice through the aft fuselage or other nacelle. The door is rotated to an open position, for example and preferably by a cable drive system. The door is suspended by tracks mounted on its inner surface and roller carriages attached to the aft fuselage or nacelle structure. The track and carriage configuration prevents binding as it is a three-point suspension with predetermined clearances in the closed position. Hydraulically actuated interconnected hooks along with lock pins at the pressure door hold the door in the locked position. One-half of the pressure bulkhead is fixed to the aircraft and the other half is carried by the aft cargo door providing automatic pressure door opening with aft cargo door opening. Inflatable pressure seals are used to seal the door in the closed position.

8 Claims, 8 Drawing Figures

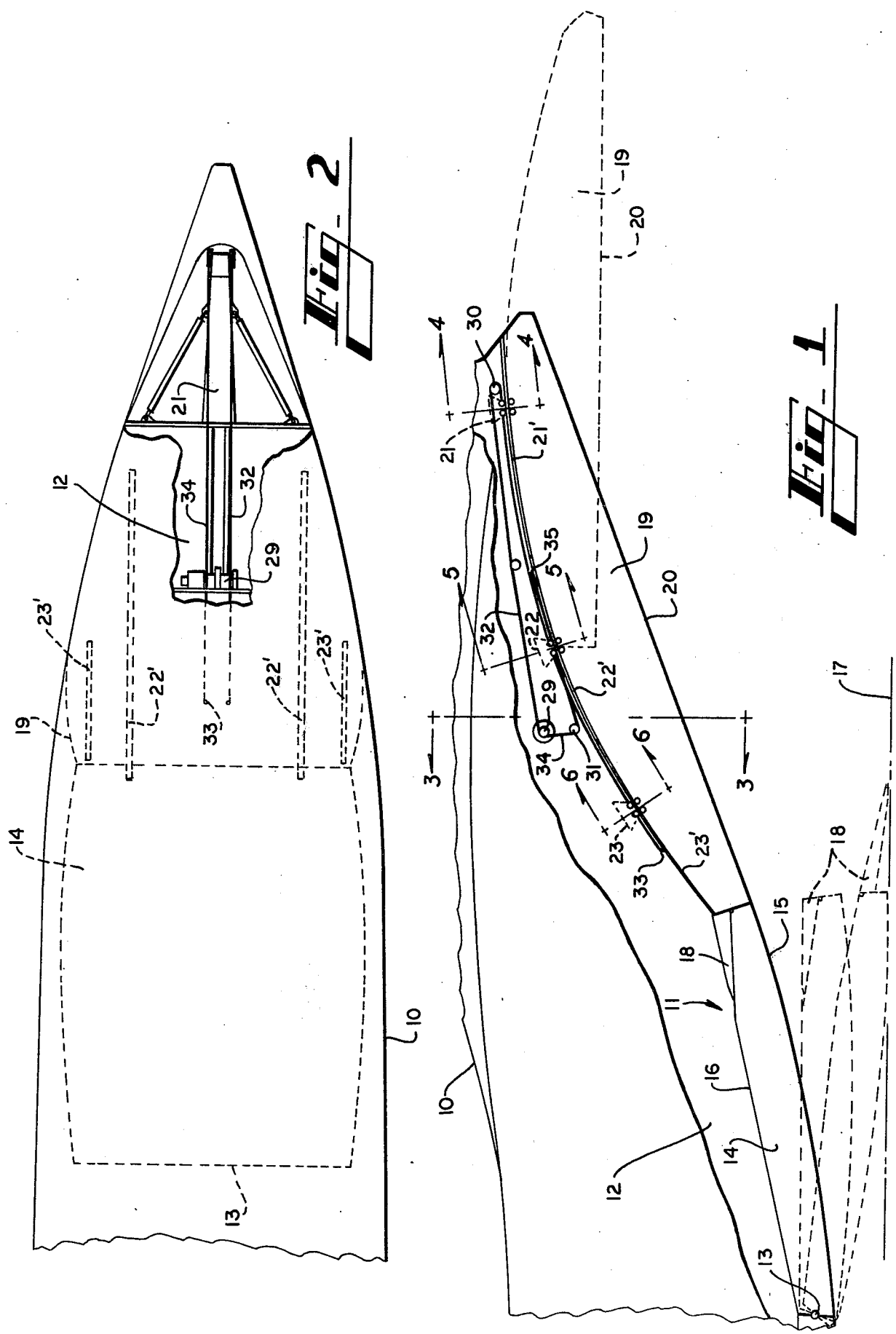

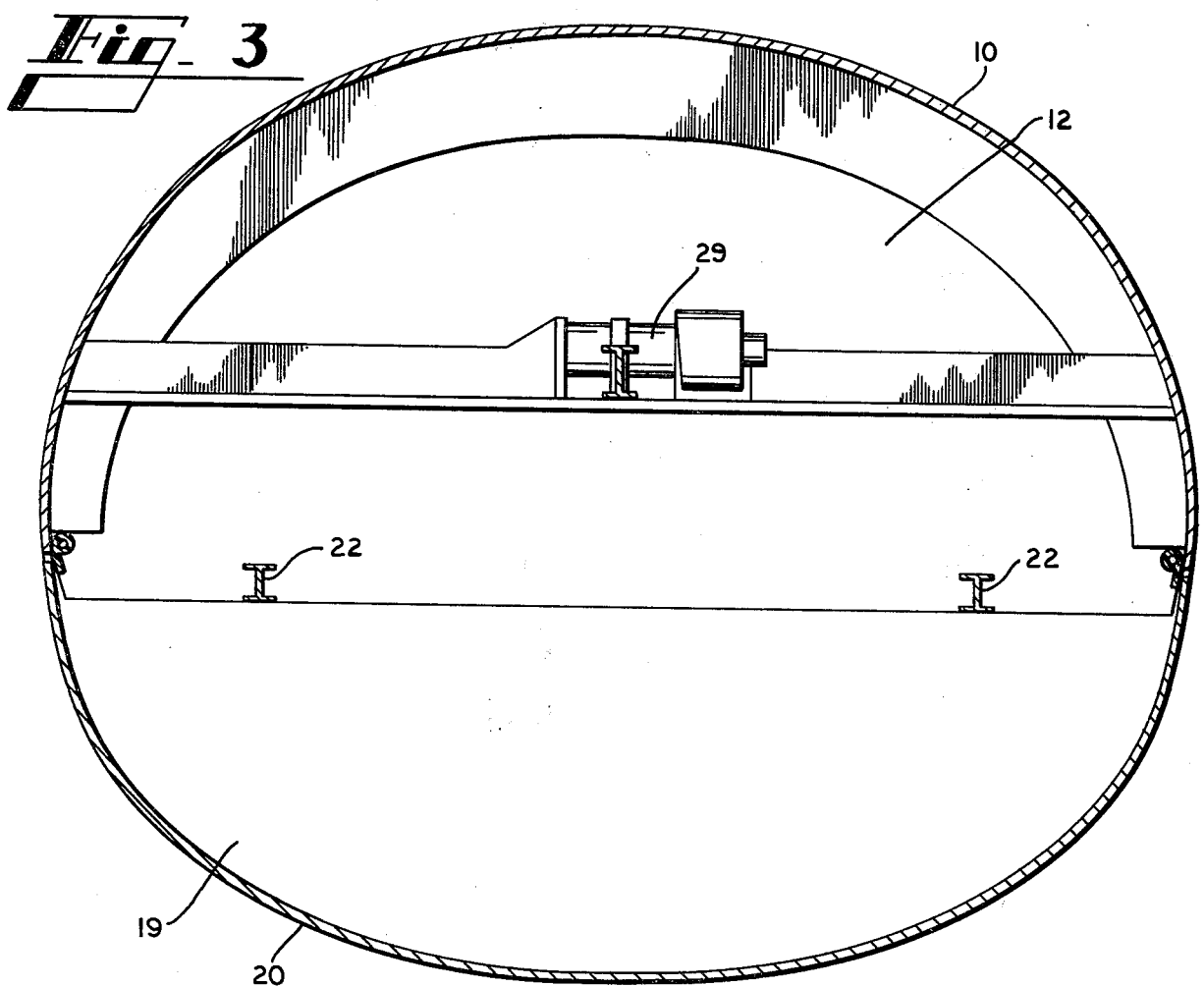
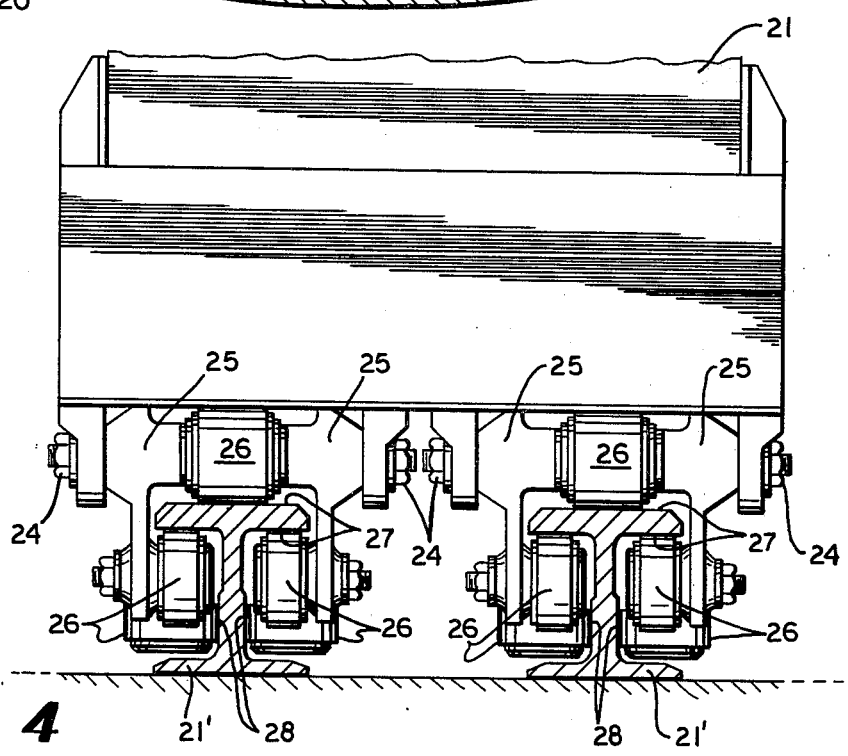

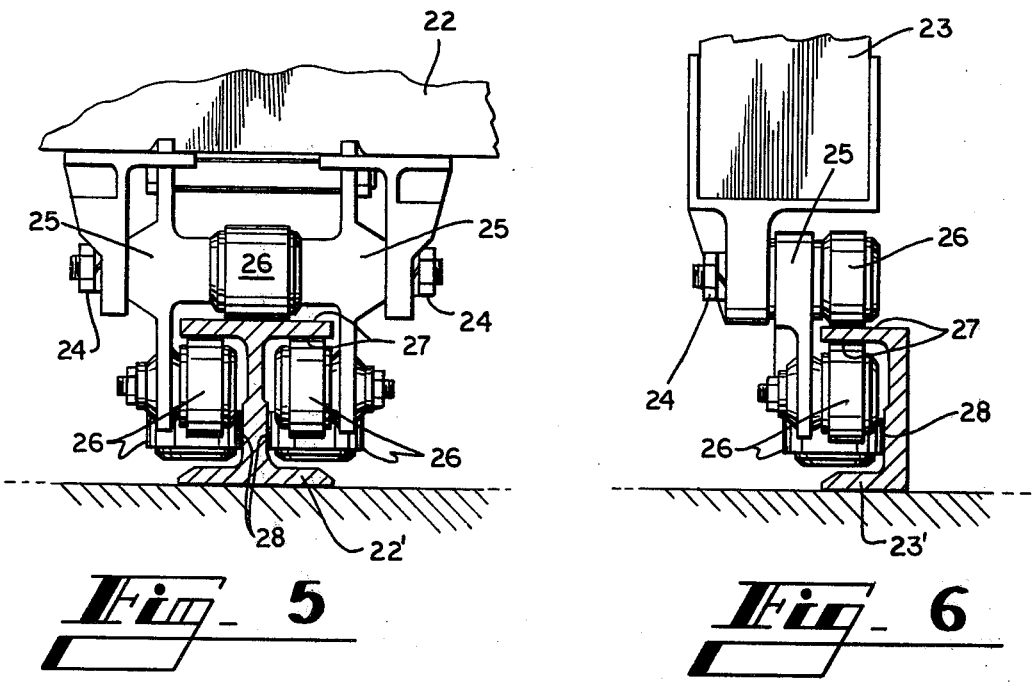
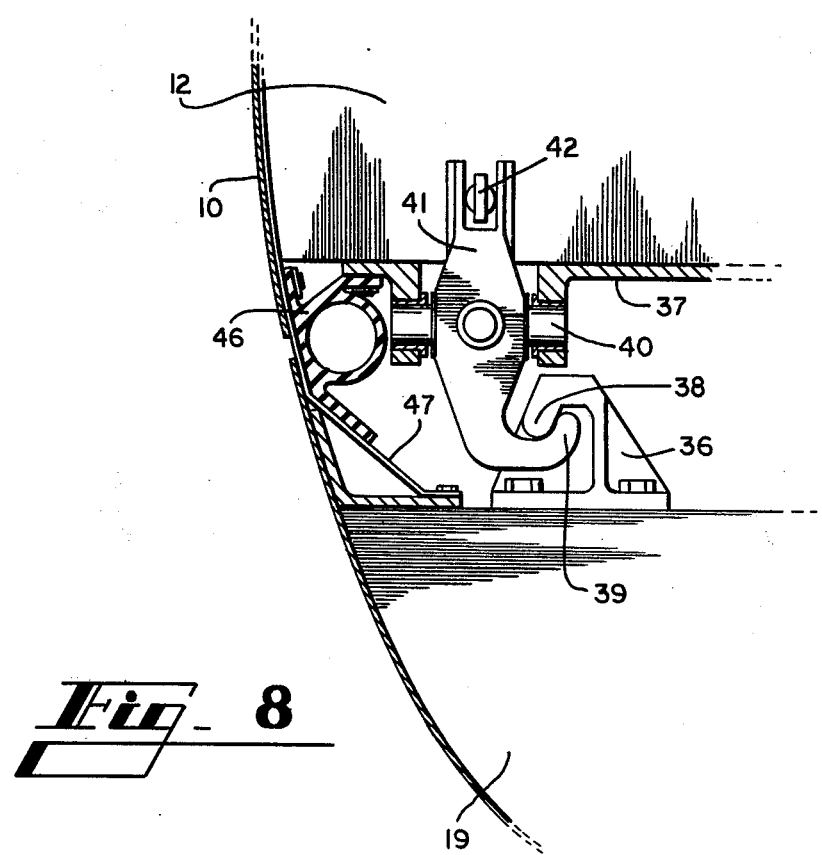

AFT CARGO DOOR FOR AIRCRAFT

This invention relates to doors associated with openings provided in aircraft to permit on- and off- loading, as well as airdrop of cargo, and more particularly to an improved aft cargo door including the operating mechanism therefor presenting minimum drag on the aircraft both in cruise and during the airdrop operation.

In aircraft with aft openings in its nacelles, notably fuselages, for the on- and off- loading of cargo relatively high empennages become necessary in order to facilitate the movement of the cargo thereunder and into and out of the aircraft hold. In addition, the efficient accommodation of cargo in the hold makes it desirable that a relatively wide opening be provided which necessitates a foreshortened termination of the aircraft body or fuselage. This upswept, somewhat blunt shape of the fuselage afterbody has often been referred to as "beaver tail" or "platypus."

Studies show that beaver tail or platypus fuselages have much greater drag and more negative lift than those which taper to a sharp point. At higher aircraft speeds, i.e., speeds on the order of Mach 1 and above, it is imperative that such afterbody drag is reduced. Thus, efforts have been underway to find a means of reducing this afterbody drag.

To date these efforts have produced various closure designs for the aft cargo openings which permit superior fineness ratio and a reduced wetted area of the fuselage. In essence, these proposed designs contemplate an aft fuselage having a horizontal rather than a vertical ellipse. To this end proposals heretofore have envisioned segmented closures, usually articulated, which contain the closure parts within the relatively sharp or pointed tail profile when in the fully open position.

As an alternate to the articulated or segmented closure or door, inflatable closure structures have been suggested. These are fabrications of elastic materials with built-in shape forming structures which permit an expansion of the closure to a predetermined configuration overlying and filling the cargo opening and a collapse thereof when desired to permit access to the aircraft hold for loading or unloading cargo.

For one reason or another all of the prior concepts and designs have been unsatisfactory. Where they have proven to be structurally reliable, they have been unduly heavy; they inevitably are complex in number and movement of parts; their service life is short.

It is a principle purpose, therefore, of this invention to provide an aft cargo door for aircraft and the mechanism required to operate it which offers improved structural reliability, an extended service life, reduced airframe weight and costs while substantially reducing aft body drag. More specifically, the door herein proposed is a one piece structure configured to form the aft, underside of the aircraft fuselage which tapers to a relatively sharp point where it is locked in the closed position. When unlocked, a power drive moves the door to and from the fully open position longitudinally aft of the fuselage to lie at all times within the maximum transverse profile of the fuselage to which it is connected at and along its length throughout such movement.

With the above and other objects in view as will become more apparent, this invention consists in the construction, combination and arrangement of parts all as hereinafter more fully described, claimed and illustrated in the accompanying drawings, wherein:

FIG. 1 is a side elevation of an aircraft fuselage afterbody having an opening therein for cargo loading and unloading and a door including its operating mechanism designed and constructed in accordance with the teachings of this invention closing such opening, the open positions of the door and associated ramp being shown in dotted lines;

FIG. 2 is a plan view of the fuselage afterbody illustrated in FIG. 1 to show primarily the multiple connections of the door at and along the aircraft and containment of the door within the maximum transverse profile of the fuselage when in the fully open position;

FIG. 3 is a section taken along the line 3—3 of FIG. 1 to show primarily the location and mounting of the power drive for the door as well as the multiple support tracks by and through which the door is connected to the aircraft;

FIG. 4 is a section taken along the line 4—4 of FIG. 1 to show the connection element between the aircraft and door in the form of a carriage secured to the aft end of the fuselage and a track secured to the adjacent door structure at and along the center thereof;

FIG. 5 is a section taken along the line 5—5 of FIG. 1 to show the connection element between the aircraft and door in the form of a carriage secured to the fuselage on each side of the connection element shown in FIG. 4 and a track secured to the adjacent door structure at and along each outer side thereof;

FIG. 6 is a section taken along the line 6—6 of FIG. 1 to show a supplemental connection element between the aircraft and door in the form of a carriage secured to the fuselage on the outboard side of each connection element shown in FIG. 5 and a track secured to the adjacent door structure at and along the adjacent sides thereof;

Figure 7:
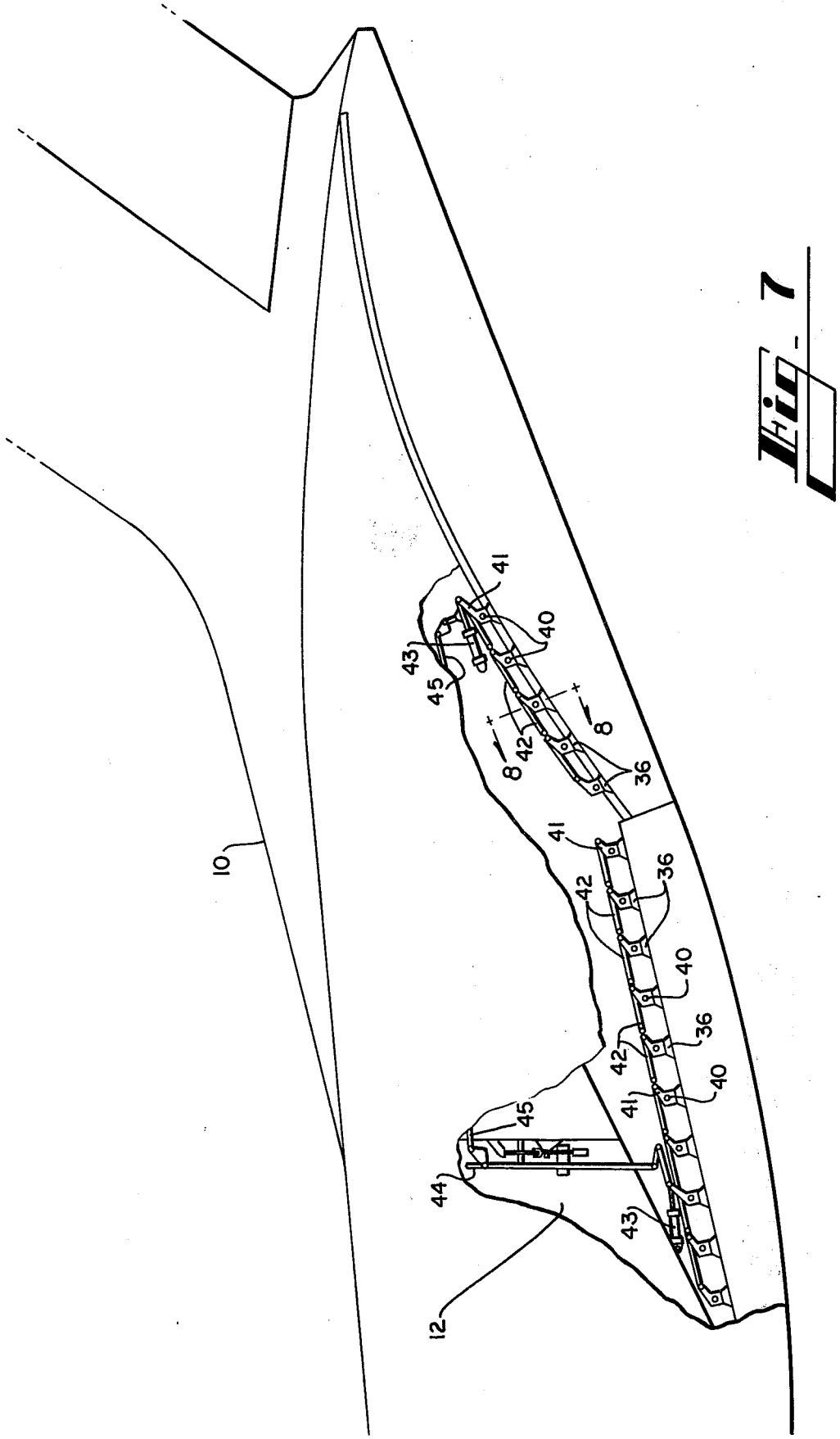

FIG. 7 is a view similar to FIG. 1 to show primarily the locking mechanism whereby the door and ramp are secured in the closed position and the actuation system for release of said mechanism to permit operation of the door and ramp to their open position; and FIG. 8 is a section taken along the line 8—8 of FIG. 7 to show primarily the details of each element comprising the locking mechanism shown in FIG. 7 and the pressure seals located between the aft cargo door and the adjacent fixed aircraft structure.

Referring more particularly to the drawings 10 designates the aft end of the fuselage of an aircraft having an opening 11 therein for access to a hold 12 in which cargo is adapted to be stowed. At and along the forward edge of the opening 11 is a hinge 13 connecting a ramp 14 thereto and about which the ramp 14 is adapted, by suitable means within the known art, to move to and from three distinct positions.

In its first position the ramp 14 abuts the adjacent edges of the fuselage 10 to fill and thereby enclose the forward portion of the opening 11. It is noted that the external surface 15 of the ramp 15 is contoured to conform, when disposed in this first position, with the adjacent external surface of the fuselage 10 to thereby constitute an aerodynamically clean and unbroken continuation thereof.

In its second position the ramp 14 is disposed outwardly of the aircraft 10 where it forms, in effect, an extension of the floor of the hold 12. To this end the internal surface 16 of the ramp 14 is configured relatively flat, it being intended for use in this position to facilitate the airdrop of cargo operation, as will become more apparent.

In its third position the ramp 14 is disposed at an obtuse angle relative to the floor of the aircraft hold 12 where it may contact the ground or other surface 17. If desired, a hinged toe plate 18 may be provided on the outer end of the ramp 14. In any event in this position the ramp 14 facilitates the on and off loading of cargo operation.

Mounted on the fuselage 10 aft of the ramp 14 is a door 19 adapted to move to and from extreme positions where it overlies and encloses the portion of the opening 11 beyond the ramp 14 and is removed therefrom to expose the fuselage interior or hold 12 for the free and unrestricted movement of cargo therethrough. In its first extreme or closed position the door 19 coacts with or abuts the edges of the fuselage 10 defining the opening 11 and the aft edge of the ramp 14 when located in its first or closed position. The external surface 20 of the door 19 is contoured to conform, when disposed in this first position, with the adjacent external surface of the fuselage 10 and the surface 15 of the ramp 14 to thereby form an aerodynamically smooth and unbroken continuation thereof.

In its other extreme or open position the door 19 extends aft of the fuselage 10, being made to move in a path which is within the lateral boundaries, i.e., maximum profile, of the fuselage 10 at all times. To this end a plurality of generally parallel track and roller arrangements are provided on the door 19 and adjacent fuselage 10 in conjunction with a drive system for the controlled relative movement of the door 19.

More specifically, a center support pylon 21, a pair of outboard support pylons 22 and a pair of guide support pylons 23 are provided as fixed structure of the fuselage 10. Pivotally secured, as at 24, to and depending from each pylon 21, 22 and 23 is a carriage 25, each mounting a plurality of rollers 26 disposed in planes at right angles one to the other for coaction with a fixed track 21', 22' and 23' carried by the door 19. For all intents and purposes the several carriages 25 and rollers 26 are identical as are the several tracks 21', 22' and 23' on which they operate. They differ only in size and number, it being required that each track 21', 22' and 23' provide a pair of opposite, generally horizontal and vertical surfaces 27 and 28 respectively which serve as rails on which the several rollers 26 operate whereby all relative lateral movement of the door 19 is prevented. Thus, the vertically disposed rollers 26 move along the upper and lower horizontal surfaces 27 while the horizontally disposed rollers 26 move along the opposite sides of the vertical surfaces 28.

The drive system for operation of the door 19 to and from its extreme positions in its preferred form is envisioned as a powered cable arrangement. In essence, this system consists of a reversible motor driven drum or spool 29 secured to fuselage structure in any conventional manner at substantially the transverse center of the fuselage 10 proximate the midpoint between the support pylons 22 and 23 and a first and second pulley 30 and 31 respectively secured to the fuselage structure proximate opposite ends of the door 19 when disposed in the closed position. A first cable 32 extending from the spool 29 around the first pulley 30 is secured, as at 33, to the door 19 adjacent its forward end. A second cable 34 extending from the spool 29 in the opposite direction from the first cable 32 around the second pulley 31 is secured, as at 35, to the door 19 adjacent its aft end. Thus, as the motor driven spool 29 operates in each direction the door 19 is moved accordingly to the extreme positions of open and closed, described above.

With the door 19 and ramp 14 disposed within and thereby closing the opening 11 a plurality of spaced fittings 36 carried by the door 19 and ramp 14 at and along the edges thereof are located adjacent a corresponding number of fittings 37 carried by the fuselage 10. Each pair of these fittings 36 and 37 terminate in hooks 38 and 39 respectively which are complemental to each other, being designed and adapted to overlap and engage and thereby secure the door 19 and ramp 14 in the closed position. While the several door fittings 36 and hooks 38 are stationary, the several fuselage hooks 39 are mounted for rotation on and about a fixed pivot 40 carried by their fittings 37 to permit their engagement and disengagement with their respective door hooks 38.

At their opposite ends the hooks 39 each terminate in an arm 41 adapted to pivotally connect to an interconnecting rod 42 whereby the several hooks 39 on each side of the door 19 and ramp 14 are actuated in unison. Such operation may be effected by a power actuator 43 operatively connected to each rod 42 on one corresponding side of the door and ramp opening 11 with appropriate crossover interconnecting linkage 44 between the rods 42 on opposite sides of the opening 11. The actuators 43 may be remotely controlled by means of and through suitable linkage 45.

In addition, when the door 19 and ramp 14 are closed and locked as described above, a pressure seal 46 carried by the aircraft structure defining the opening 11 is engaged by a complemental surface 47 carried by the relatively movable door 19 and ramp 14. The internal air pressure of the hold 12 is thereby maintained.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. In an aircraft having a nacelle with an internal pressurized hold for cargo and an access opening to said pressurized hold in the aft end portion of said nacelle for on-and-off loading of cargo, a two segment door associated with said opening for completely closing said opening comprising:

a forward door segment pivotally connected to the nacelle at the forward end of said opening for movement to and from a first position overlying and closing the forward portion of said opening and at least one second position extending outwardly of said nacelle and uncovering said opening;

an aft, one piece door segment carrying tracks slidably mounted on a plurality of center and outboard pylons carried by the nacelle for movement in an arcuate path along the aft portion of said opening to and from a first extreme position overlying and closing the aft portion of said opening and a second extreme position uncovering said opening and extending longitudinally downstream and outside of the fixed structure of said nacelle, the adjacent ends of said forward and aft door segments being unconnected one from the other at all times and adapted to abut end to end when disposed in their said first positions to thereby define and maintain said pressurized hold unobstructed, said forward and aft door segments each being defined by external surfaces which form a smooth and aerodynamically clean continuation of each other and of the adjacent nacelle surface when located in their said first positions;

a seal carried by said nacelle and defining said opening and a complemental surface carried by each of said forward and aft door segments for engagement with said seal when said segments are located in their said first positions; and a releasable lock operative to secure said segments against substantially all movement relative to each other and to the nacelle when said segments are each in their said first positions.

2. The two segment door of claim 1 including an anti-friction device between said aft door segment and said nacelle formed by at least one of said tracks.

3. The two segment door of claim 2 wherein said anti-friction device includes said at least one track defining a plurality of roller surfaces disposed in opposition and at angles relative to each other and at least one roller operative on and against each said surface.

4. The two segment door of claim 3 wherein a plurality of said tracks are parallelly disposed and said rollers are carried by the nacelle.

5. The two segment door of claim 1 including a power drive operatively connected between the nacelle and said aft door segment.

6. The two segment door of claim 1 wherein said lock includes a plurality of complemental hook fittings carried by the nacelle and said door segments interconnected by actuating mechanisms for the operation thereof in unison.

7. The two segment door of claim 5 wherein said power drive includes a reversible motor driven spool secured to the nacelle at substantially the transverse center thereof and a cable arrangement interconnecting said spool and the aft door segment proximate opposite ends thereof.

8. The two segment door of claim 1 wherein said forward door segment includes a retractable extension whereby the length of the inner surface thereof may be increased.

* * * * *